United States Patent [19]

Houle et al.

[11] Patent Number: 5,364,116

[45] Date of Patent: Nov. 15, 1994

[54] AUTOMATIC STEERING ASSEMBLY FOR TOWED VEHICLE

[75] Inventors: Michel Houle, Wickham; Alain Courtemanche, St-Nicephore; Denis Courtemanche, St-Theodore d'Acton, all of Canada

[73] Assignee: J. Houle Et Fils Inc., Drummondville, Canada

[21] Appl. No.: 159,173

[22] Filed: Nov. 30, 1993

[51] Int. Cl.$^5$ .......................... B62D 13/00; B62D 5/06
[52] U.S. Cl. .................................... 280/442; 280/426; 280/444
[58] Field of Search ............... 280/426, 442, 443, 444, 280/445

[56] References Cited

U.S. PATENT DOCUMENTS

| | | |
|---|---|---|
| 2,510,525 | 6/1948 | Smart et al. |
| 3,212,793 | 10/1965 | Pietroroia . |
| 3,229,986 | 1/1966 | Ferris . |
| 3,393,922 | 7/1968 | Adams . |
| 3,591,203 | 7/1971 | Steiner . |
| 3,834,480 | 9/1974 | McGee . |
| 4,603,873 | 8/1986 | Perlini . |
| 5,234,069 | 8/1993 | Krone et al. ................. 280/442 |
| 5,244,226 | 9/1993 | Bergh ........................ 280/426 |

*Primary Examiner*—Mitchell J. Hill
*Attorney, Agent, or Firm*—Edwin E. Greigg; Ronald E. Greigg

[57] ABSTRACT

An automatic, hydraulically-operated steering assembly for a towed vehicle is disclosed. Each set of steerable ground-engaging wheels of this towed vehicle is steered by a double action piston fed by a pair of hydraulic hoses connected to a control valve actuated by a pivotal device and a control rod. A bypass is provided between the two hydraulic hoses to allow the hydraulic pressure to slowly equilibrate in the two hoses and thus allow the wheels to return in their straight line position when the source of pressurized fluid is normally disengaged or in the case of a failure of the hydraulic system. Advantageously, the valve is controlled by a push-pull cable having one end attached to one wheel and another end to the valve. The towed vehicle may comprise one or more sets of steerable wheels. In the latter case, the front and rear sets of wheels are adapted to pivot in either direction, the middle set being non-pivotal.

20 Claims, 4 Drawing Sheets

AUTOMATIC STEERING ASSEMBLY FOR TOWED VEHICLE

BACKGROUND OF THE INVENTION a) Field of the Invention

The present invention relates to an automatic steering assembly for a towed vehicle, and more particularly to a steering assembly of the hydraulic type, which can operatively be connected to the hydraulic system of a towing vehicle.

b) Brief Description of the Prior Art

It has been known for many years to provide automatic steering assemblies for trailers of the type comprising a hitching bar connectable to the drawbar of a towing vehicle, such as a farm tractor or a road vehicle. Such trailers have a frame on which is mounted at least one pair of wheels adapted to turn either to the right or to the left. Pivoting of the wheels is usually controlled by a hydraulic circuit which operates as a function of the angular displacement of the towing vehicle relative to the hitching bar of the trailer.

It is also known to use spring means to return the wheels of the trailer to a straight position when the towing vehicle resumes travel in a straight line.

Automatic steering assemblies embodying the above features are disclosed, by way of examples, in U.S. Pat. No. 2,510,525 issued to SMART et al. on Jun. 6, 1950; U.S. Pat. No. 3,212,793 issued to PIETROROIA on Oct. 19, 1965 and U.S. Pat. No. 4,824,135 issued to McGREGOR on Apr. 25, 1989.

A first problem that has been noticed so far with most of these known automatic steering assemblies for trailers is that they are made of a great number of mechanical parts, both fixed and moving, which are subject to wear and tear and eventual, if not short-term, breakage.

Another more important problem with all the known automatic steering assemblies for trailers is that they do not provide any positive means to allow the wheels to return to their original, straight line position in the case of a hydraulic failure. Thus, for example, if the directional valve of the hydraulic circuit jams in a given position while the hydraulic power is cut off, the wheels remain steered and cannot return to their straight-line position, even if they are spring-biased.

A further problem with most known automatic steering assemblies for trailers is that they comprise mechanical pivot devices for use to control the hydraulic circuit as a function of the angular displacement of the towing vehicle relative to the hitching bar of the trailer, which are either very complicated in structure and/or become very slack and poorly efficient.

OBJECTS AND SUMMARY OF THE INVENTION

A first object of the present invention is to provide an automatic, hydraulically-operated steering assembly for a towed vehicle, which is of a simplified design and long-lasting construction.

Another object of the invention is to provide an automatic steering assembly of the above type, which is so devised as to allow the steering wheels of the towed vehicle to return to their straight line position whenever the hydraulic fluid supply from the towing vehicle is normally disengaged for high speed road travelling to reduce tire wear, or in the case of a hydraulic power and/or valve failure.

A further object of the invention is to provide an automatic steering assembly of the above type, which includes a pivot device for use to control steering of the wheels as a function of the angular displacement of the towing vehicle, that is both very simple in structure and very efficient in use, thereby reducing the slack encountered so far and the stress caused by said slack to all the mechanical parts of the steering assembly of the towed vehicle.

In accordance with the invention, these objects are achieved with an automatic, hydraulically-operated steering assembly for a towed vehicle of the type comprising: a frame having a longitudinal axis; a hitching bar projecting forwardly from the frame, this hitching bar having a front end connectable to a towing vehicle; and one or more sets of steerable wheels, the wheels of each set being symmetrical with respect to the longitudinal axis and pivotally mounted onto the frame with suitable mounting means so as to be steerable to the right or to the left with respect to a straight position in which the wheels are aligned with the longitudinal axis of the frame.

The steering assembly according to the invention basically comprises:

(a) a hydraulic cylinder for each set of steerable wheels, this cylinder being transversal to the longitudinal axis of the frame;

(b) a double-action piston housed in the cylinder, the piston dividing the cylinder into two opposite chambers and having piston rods projecting out of the chambers on either side of the cylinder, each piston rod having a free end connected to the mounting means of one of the wheels so as to steer this wheel;

(c) a hydraulic system operatively connectable to a source of pressurized fluid carried by the towing vehicle so as to actuate the piston housed in the cylinder and thus cause the wheels to pivot in unison, the hydraulic system including a directional valve and a pair of hydraulic hoses, each of these hoses being operatively connected at one end to the directional valve and at the other end to one of the chambers of the cylinder, respectively;

(d) a control system for the hydraulic system, this control system actuating the directional valve as soon as the towing vehicle starts turning and thus causing the pressurized fluid to be injected into one of the hoses so as to steer the wheels in such a direction as to substantially follow the towing vehicle;

(e) resilient biasing means to return the wheels to their straight position; and (f) a bypass joining the two hoses between the directional valve and the cylinder, whereby hydraulic pressure can slowly equilibrate automatically in the two hoses and accordingly in the two opposite chambers of the cylinder to prevent jamming of the wheels and to allow the same to return to their straight position automatically under the action of the resilient biasing means when the source of pressurized fluid is disengaged or in the case of a failure of the hydraulic system.

Preferably, the directional valve is of the drawer type. In such a case, the control system (d) mentioned hereinabove preferably comprises a pivotal device fixed to the front end of the hitching bar. This pivotal device comprises:

a pivot plate pivotally mounted on the front end so as to be rotatable with limited slack about a vertical axis substantially perpendicular to the longitudinal axis of the frame; and a steering fork connected to the pivot plate, this fork being operatively connectable to the towing vehicle so as to rotate the pivot plate about its vertical axis to the same extent as the towing vehicle when the same turns.

The steering fork of the pivotal device extends from the pivot plate towards the drawbar so as to engage the same, and is preferably tiltably mounted onto the pivot plate about a pivot axis that is transversal to the vertical axis of rotation of this pivot plate so as to allow the drawbar to tilt up and down relative to the hitching bar without unduly rotating the pivot plate.

The control system (d) also comprises a control rod having one end pivotally attached to one side of the pivot plate at a given distance from the vertical axis and another end connected to and holding the directional valve so as to move this directional valve forwards or rearwards when the rod is pulled or pushed as a result of the rotation of the pivot plate.

The control system (d) further comprises control means for controlling and operating the directional valve as a function of the relative position of the steerable valve and of said steerable wheels. Preferably, the control means comprises a push-pull cable having one end linked to the drawer of the valve and another end linked to one of the mounting means of the steerable wheels.

BRIEF DESCRIPTION OF THE DRAWINGS

The invention and its numerous advantages will be better understood upon reading of the following, non-restrictive description of a preferred embodiment thereof, given with reference to the accompanying drawings in which.

DESCRIPTION OF TWO PREFERRED EMBODIMENTS OF THE INVENTION

Figure 1:
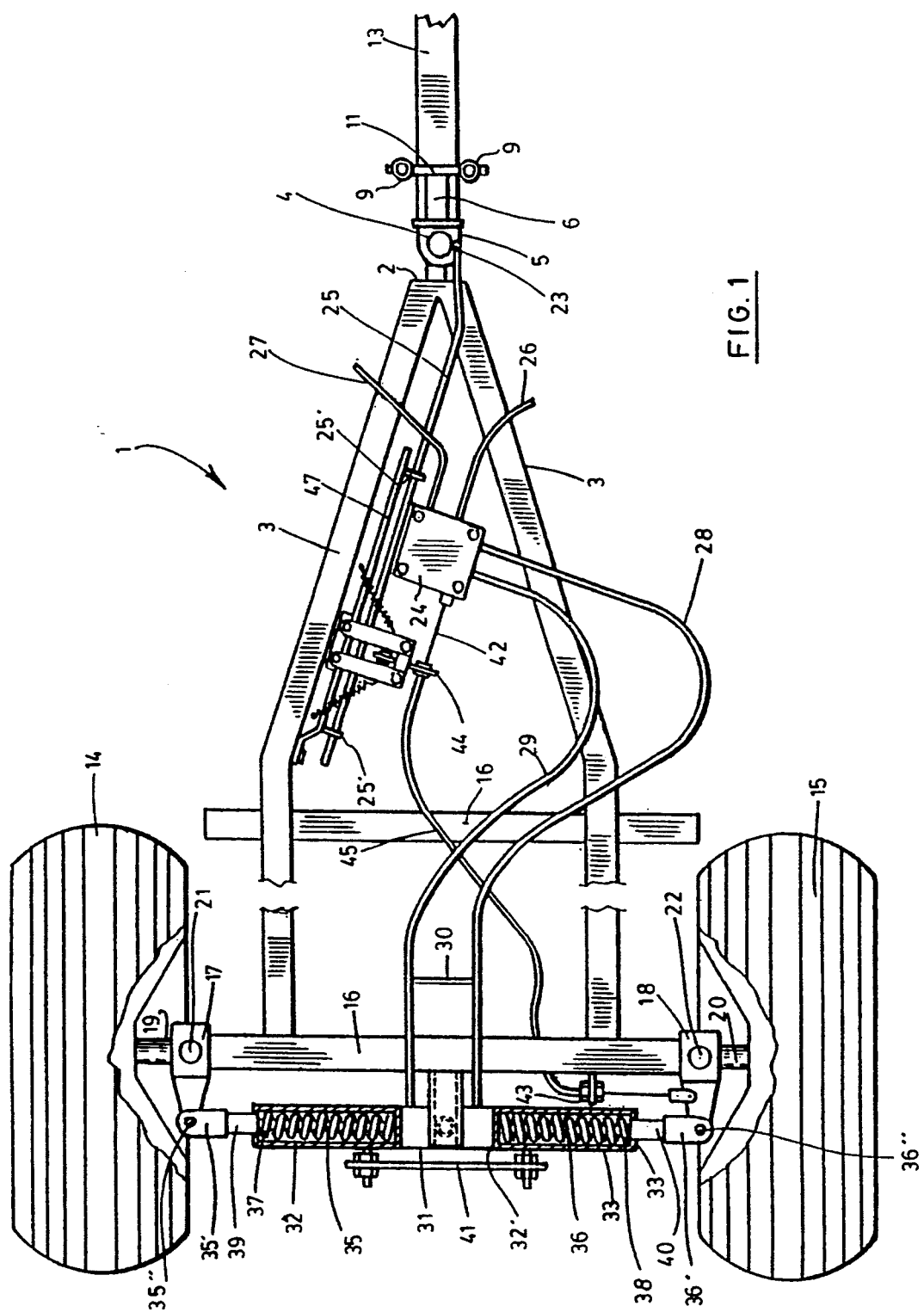
FIG. 1 is a top plan view of a first embodiment of the invention, showing a trailer frame provided with a single set of steerable wheels at the rear, some portions of this view being sectioned and broken away.
Figure 2:
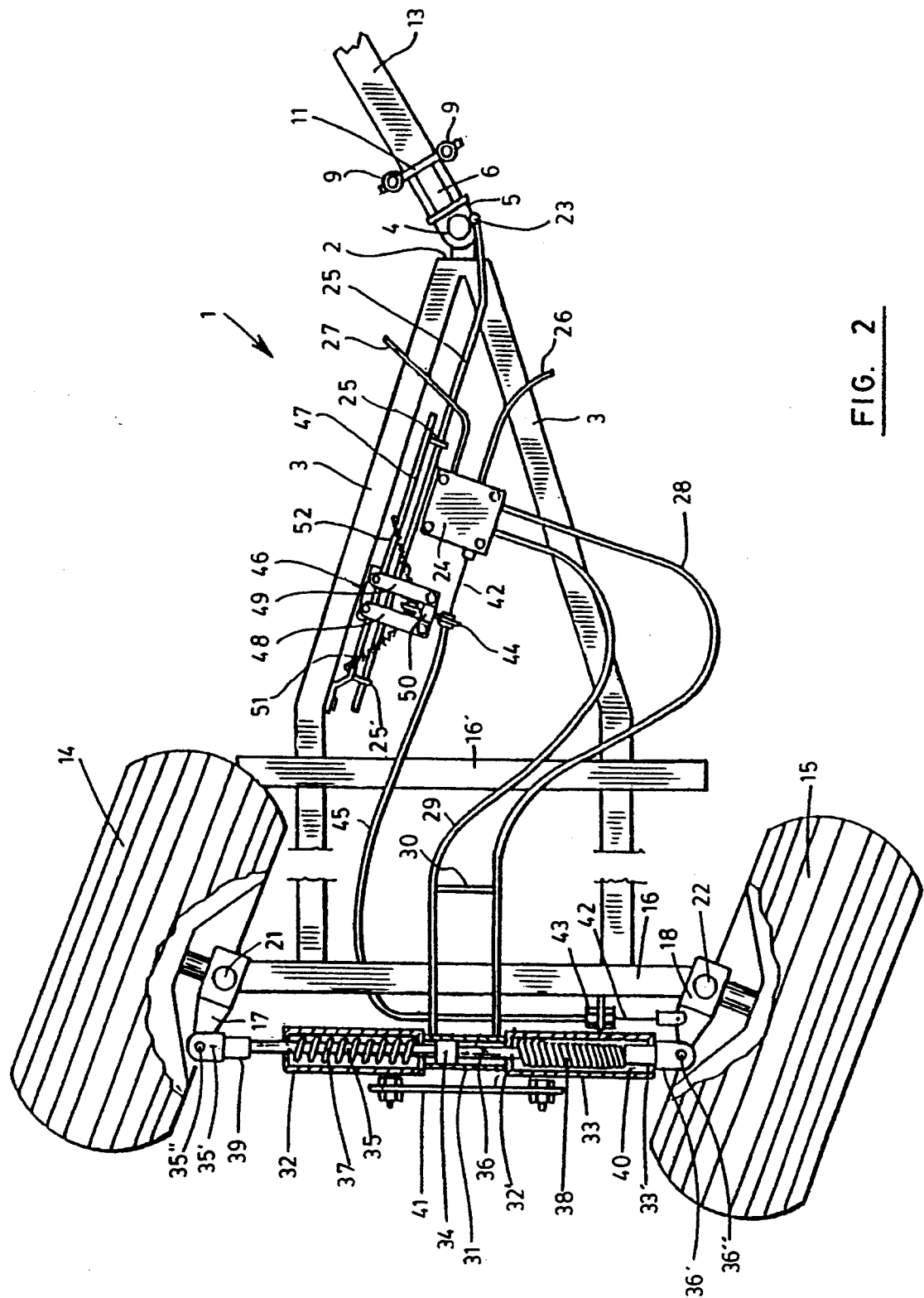
FIG. 2 is a view similar to that of FIG. 1 but showing the drawbar of the towing vehicle and the steerable wheels oriented for left-hand turning.

FIGS. 1 and 2 of the drawings show the frame 1 of a towed vehicle having only one pair of steerable wheels at the rear. FIGS. 1 and 2 also show the automatic steering assembly used in accordance with the invention for steering the steerable wheels of this towed vehicle which can be, for example, a heavy-load carrying trailer, a liquid manure tanker-spreader or any other kind of vehicle adapted to be towed by a towing vehicle, such as a farm tractor.

As is shown in these FIGS., the frame 1 includes a longitudinally-oriented hitching bar 2 connected to the remaining of the frame 1 by a pair of frontwardly converging side bars 3.

Figure 4:
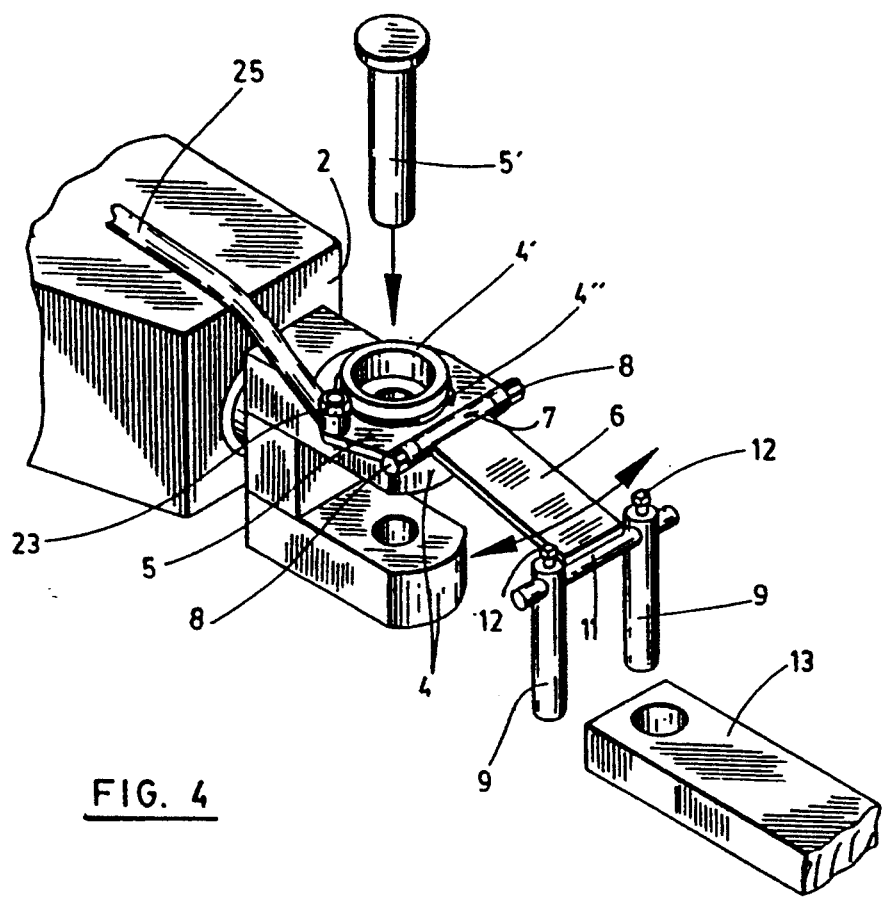
FIG. 4 is a perspective view of the front portion of the towing bar of the trailer frame of FIGS. 1 to 3, showing the pivot device used to operate the valve of the steering assembly and the way the hitching of a towing vehicle is engaged in this pivot device.

FIG. 4 shows the front end of the hitching bar 2. This front end is provided with a jaw element 4 for use to connect the hitching bar to a drawbar 13 projecting rearwardly from the towing vehicle (not shown). The jaw element 4 comprises an upper horizontal ear and a lower horizontal ear between which the rear end of the drawbar 13 can be inserted. A connection bolt 5' is inserted into vertically aligned oversized holes made in the ears of the jaw element 4 and in the rear end of the drawbar 13 so as to pivotally connect the latter to the hitching bar 2 in a slackable manner. A groove bushing 4' coaxial with the connection bolt 5', is located on top of the upper ear of the jaw element. This bushing has a snap-ring 4" to pivotally mount and retain a pivot plate 5 independently of the connection bolt 5'. The plate 5 has a front edge provided with a hinge 7 that is transversal to the bushing 4' and connection bolt and thus to the rotation axis of the pivot plate. The hinge 7 is bounded by bolts and nuts 8 and connected to one end of a rigid strip 6 whose opposite end has a short rod 11 which extends through holes provided in a pair of spaced-apart fingers 9 which are intended to vertically extend on each side of the drawbar 13 in use. As can be appreciated, the hinged strip and fingers together form a steering fork which, in use, is operatively connected to the drawbar 13 in such a manner as to rotate the pivot plate 5 to the same extent as the towing vehicle when the same turns.

As is shown, the upper end of each finger 9 is preferably provided with a tightening screw 12 making it possible to adjust the spacing of the fingers 9 to drawbars of varying widths.

As aforesaid, it is clear that when the towing vehicle turns in either direction, the drawbar 13 will push against one of the fingers 9 and thus will cause the pivot plate 5 to pivot in the same direction about the bushing 4'. The fact that the steering fork is hingedly mounted onto the pivot plate 5 is quite interesting. Indeed, such a feature allows, on the one hand, the operator to tilt the fingers 9, rod 11 and strip 6 upwardly so as to insert or remove the drawbar 13 into the jaw element 4 for connecting the towed vehicle to the towing one, and, on the other hand, the drawbar 13 to be tilted up and down relative to the hitching bar 2 without unduly rotating the pivot plate 5.

Referring again to FIGS. 1 and 2, there is shown that the frame 1 has one pair of steerable wheels 14, 15 at the rear. The frame 1 may also have other, non-steerable wheels (not shown) mounted at the ends of one or more middle and/or front transaxles like the one numbered 16', depending on the load to be carried. The steerable wheels 14, 15 are symmetrical with respect to the longitudinal axis of the frame and pivotally connected to the same so as to be steerable to the right and to the left with respect to a straight position in which the wheels are aligned with the longitudinal axis of the frame. Such a pivotable connection is achieved with wheel mounting means comprising a rear transaxle 16 extending transversally across the frame and a pair of knuckles 17, 18 each having an inner side pivotally secured by a pivot pin 21, 22 to each end of the transaxle 16. Attached to the outer sides of the knuckles 17, 18 are a pair of stub axles 19, 20 upon which the wheels 14, 15 are rotatably mounted.

The steering assembly according to the invention comprises a hydraulic system operatively connectable to a source of pressurized fluid carried by the towing vehicle.

This hydraulic system comprises a directional valve 24 fixed to a control rod 25 connected to the pivot plate 5 as will be described later. The valve 24 is preferably of the drawer type and is connected to the hydraulic system of the tractor via a pair of hydraulic hoses 26, 27. Also connected to the valve 24 is a pair of hydraulic hoses 28, 29 having opposite ends operatively connected to a hydraulic cylinder 31 extending transversally to the longitudinal axis of the frame and mounted to the rear transaxle 16. The cylinder 31 houses a piston 34 (seen in FIG. 2) which divides it into two opposite chambers, each of which is connected to one of the hoses 28, 29. The piston 34 has a pair of transversely opposed piston rods 35, 36 which extends out of the chambers and are fixed at their outer ends to links 35', 36', respectively, the latter being in turn pivotally attached to the knuckles 17, 18 by pivot pins 35'', 36'' respectively, at a distance away from the pivot pins 21, 22.

In accordance with an essential feature of the invention, a bypass 30 is provided between the hoses 28, 29, as will be explained.

Figure 5:
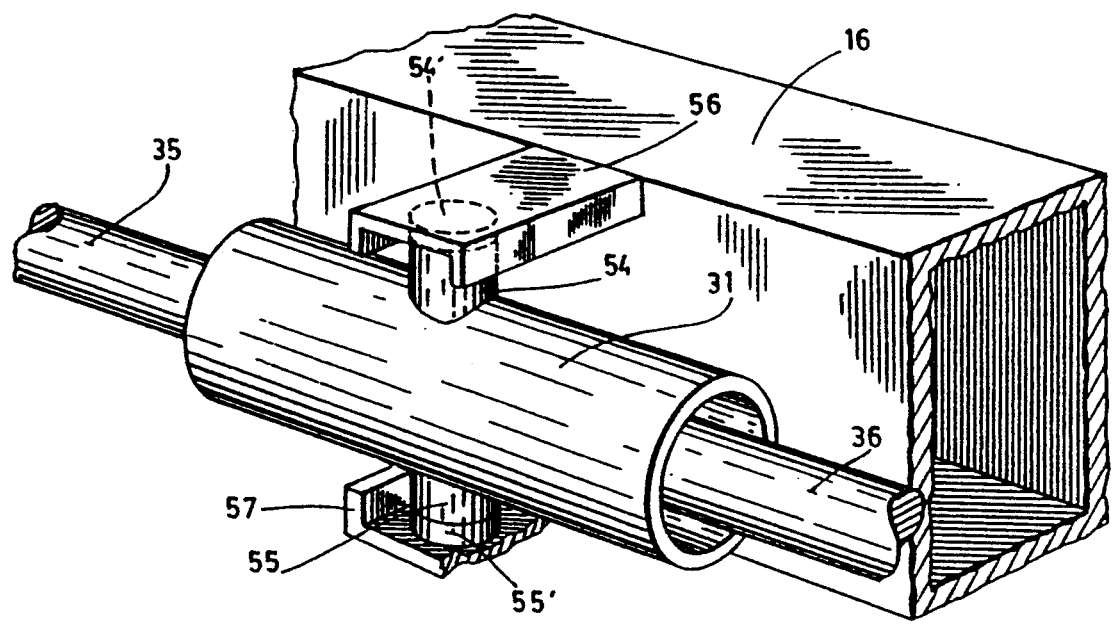
FIG. 5 is a partial perspective view of the longitudinal displacement means of the hydraulic cylinder used for actuating each set of steerable wheels.

As is shown in FIG. 5, the cylinder 31 is preferably mounted to the transaxle 16. To make such a connection possible, longitudinal displacement means must be provided to allow the cylinder and its related parts to move towards and away from the transaxle when the wheels are steered. Indeed, it is necessary to accommodate the slight displacement of the cylinder that is caused by the transverse curve movement of the pivot pins 35'', 36'' when the wheels pivot. The longitudinal displacement means used to connect the cylinder to the transaxle 16 advantageously comprise upper and lower stub members 54, 55 fixed to the cylinder 31 and adapted to slide in longitudinal upper and lower guide members 56, 57 rigidly fixed to the transaxle 16. Bushings 54', 55' are provided at the outer ends of the stub members for ease of sliding.

As is better shown in FIG. 2, resilient biasing means are provided as part of the steering assembly, for returning the wheels to their straight position when the same of pressurized fluid is normally disengaged for high speed road travelling to reduce tire wear, or in the case of a hydraulic power and/or valve failure. Such means include pre-compressed coil springs 37, 38 preferably mounted over the piston rods 35, 36 in cylindrical sleeves 32, 33 provided on either sides of the cylinder, respectively, and connected to each other by a reinforcing bar 41. The outer ends of the piston rods are provided with bushings 39, 40. Each sleeve include innermost and outmost spring abutment rims 32', 33' which retain the springs in their original pre-compressed state. The abutments of the bushings 39, 40 are of a smaller diameter than the rims 32', 33' and of a bigger diameter than the inside diameter of the springs (see FIG. 1) so as to be movable with the piston rods within the sleeve to compress the springs as is shown on FIG. 2.

To operate the hydraulic system of the steering assembly, a control system is provided, which actuates the directional valve 24 as soon as the towing vehicle starts turning and thus causes the pressurized fluid to be injected into one of the hoses 28, 29 so as to steer the wheels to substantially follow the same direction as the towing vehicle. This control system comprises the pivot plate 5 and steering fork disclosed hereinabove. It also comprises the control rod 25 having a forward end pivotally secured to a pivot stud 23 rigidly secured to the pivot plate 5. The opposite end of the rod 25 is slidably mounted in two supporting brackets 25' rigidly attached to a rail 47 attached to one of the side bars of the frame, namely the one numbered 3.

The control system further comprises control means for controlling and operating the valve 24 as a function of the relative positions of the valve 24 connected to the control rod, and of the steerable wheels. These control means include a push-pull cable 42 having one end linked to the drawer of the valve 24 and an opposite end linked to one of the knuckles, such as the one numbered 18, at a distance away from the pivot pin 22. This cable 42 extends through an envelope 45 which is provided with first and second attachment clasps 43 and 44, respectively. The first clasp 43 is rigidly attached to the transaxle of the vehicle. The second clasp 44 adjacent the valve 24 is connected to the frame by shock absorbing means including a short bar 46 mounted on the rail 47, a pair of pegs 48, 49 pivotally mounted to the bar 46 and a link 50 joining the opposite ends of the pegs and to which the clasp 44 is secured. A pair of oppositely-oriented tension springs 51, 52 connected to the pegs and rail, maintain this assembly in centered equilibrium. If, during a turn, the hydraulic system stops working, these shock absorbing means will move bodily with the valve 24 to protect the latter and the push-pull cable.

Figure 3:
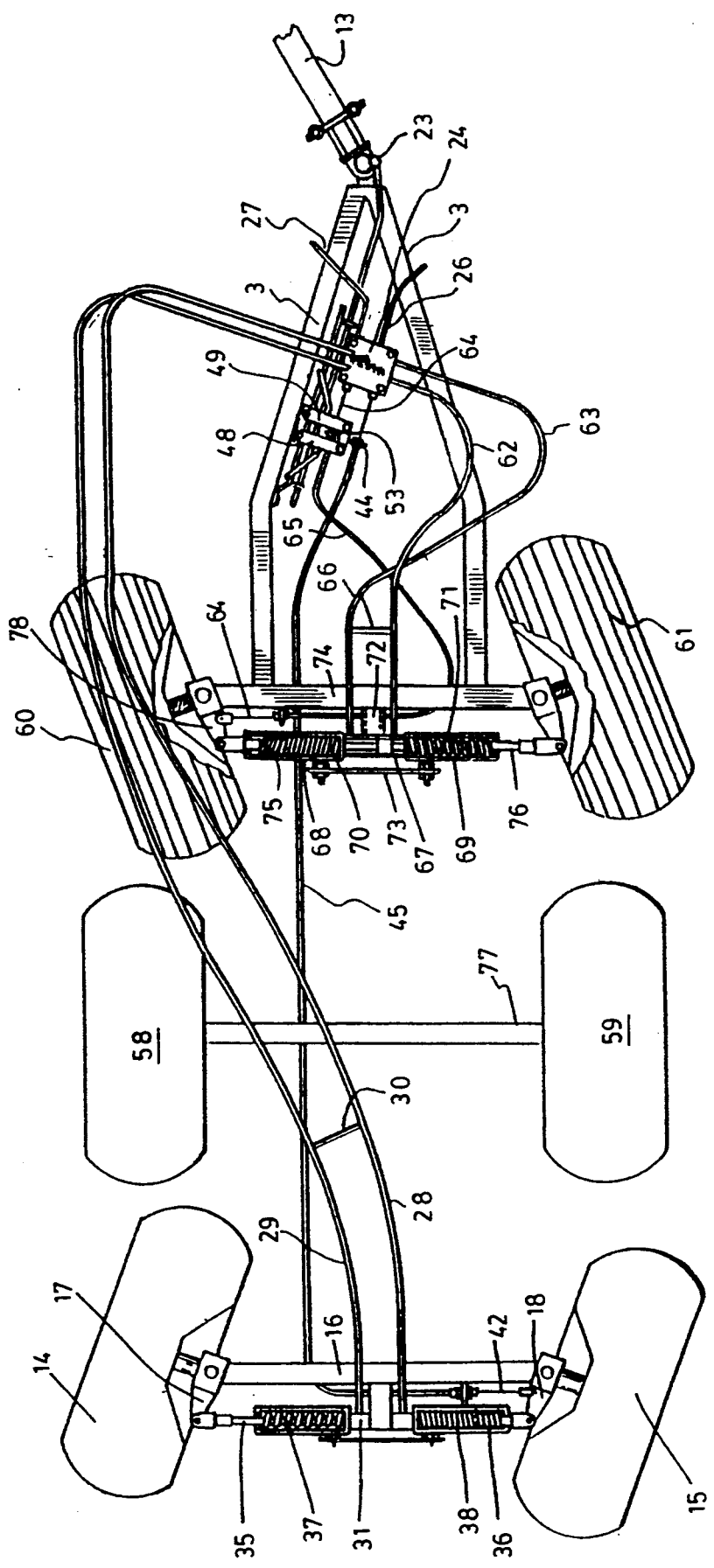
FIG. 3 is a top plan view of a second embodiment of the invention, showing a trailer frame provided with two sets of steerable wheels oriented for left-hand turning.

FIG. 3 shows the frame of another towed vehicle comprising a pair of steerable rear wheels 14, 15 like the one previously disclosed, at least one additional pair of non-steerable middle wheels 58, 59 mounted on a transversal axle 77, and a pair of steerable front wheels 60, 61. The way the rear wheels 14, 15 are mounted and steered is identical to what has been disclosed so far. The way the front wheels 60, 61 are mounted on the front portion of the frame and connected to the steering assembly is similar to the way the rear wheels 14, 15 are mounted and connected.

Thus, the steering assembly used for these front wheels also includes hydraulic hoses 62, 63, a bypass 66, a transverse cylinder 67 maintained to an adjacent transaxle 74 by suitable longitudinal displacement means 72, piston rods 75, 76 extending out of the cylinder 67, sleeves 68, 69 connected by a reinforcing bar 73, and a pair of pre-compressed springs 70, 71 housed in the sleeves.

The steering assembly used for the front wheels also comprises a push-pull cable 64 extending within an envelope 65. To cause the front wheels to steer in a direction opposite to the rear wheels and thus cause the towed vehicle to substantialy follow the towing vehicle, the hoses 62, 63 are inverted as compared to the hoses 28, 29 and the cable 64 is attached to the front wheel knuckle 78 that is opposite the rear wheel knuckle 18 to which is attached the cable 42. The cable 64 has its opposite end attached to another drawer provided in the same directional valve 24 as above. The clasp 53 to which the envelope 65 of the push-pull cable 64 is attached, is independently connected to the frame by a second shock absorbing means (not shown) located under the one to which is attached clasp 44. This arrangement causes the rear wheels and the front wheels to follow an arc of a circle when they turn, as is required.

The steering assembly according to the invention works as follows.

Let's suppose the towing vehicle starts turning to the left as shown in FIG. 2. The control rod 25 will then be pulled forward by the pivotal device of FIG. 4, along with the valve 24. At that time, the cable 42 has not moved yet. This will allow pressurized hydraulic fluid to pass into the hose 28 and hence to push the piston 34 towards the left, thereby causing the wheels to pivot to the right. As the wheels 14 and 15, pivot, the cable 42 is pushed forward, thereby tending to shut the directional valve 24 in self-regulating action, since any straightening of the wheels will pull on the cable 42, thus reopening the valve 24. In the first case, i.e. when the valve starts to close, the pressures on both sides of the piston start to slowly equilibrate by means of the bypass 30. This is important because a failure of the hydraulic system would otherwise result in a jamming of the wheels in any degree of orientation. Of course, the bypass must have a diameter small enough to ensure that there is a sufficient pressure differential between the two chambers to effectuate turning when the hydraulic system is operative. When the towing vehicle stops turning, the valve 24 is pushed rearwardly, thereby causing the drawer held by the cable 42 to invert the circulation of hydraulic fluid and to push the piston 34 back to about its central position where the wheels are in straight line.

We claim:

1. An automatic, hydraulically-operated steering assembly for a towed vehicle of the type comprising a frame having a longitudinal axis; a hitching bar projecting forwardly from the frame, said hitching bar having a front end connectable to a towing vehicle; and at least one set of steerable wheels, said wheels being symmetrical with respect to said longitudinal axis and pivotally mounted onto said frame with suitable mounting means so as to be steerable to the right or to the left with respect to a straight position in which said wheels are aligned with the longitudinal axis of said frame, said steering assembly comprising:

(a) an hydraulic cylinder for each set of steerable wheels, said cylinder being transversal to said longitudinal axis;

(b) a double-action piston housed in said cylinder, said piston dividing said cylinder into two opposite chambers and having piston rods projecting out of said chambers on either side of said cylinder, each piston rod having a free end connected to the mounting means of one of said wheels so as to steer said one wheel;

(c) a hydraulic system operatively connectable to a source of pressurized fluid carried by said towing vehicle so as to actuate said piston housed in the cylinder and thus cause said wheels to pivot in unison, said hydraulic system including a directional valve and a pair of hydraulic hoses, each of said hoses being operatively connected at one end to said directional valve and at the other end to one of the chambers of said cylinder, respectively;

(d) a control system for said hydraulic system, said control system actuating said directional valve as soon as the towing vehicle starts turning and thus causing said pressurized fluid to be injected into one of said hoses so as to steer said wheels in such a direction as to substantially follow said towing vehicle;

(e) resilient biasing means to return said wheels to their straight position; and (f) a by-pass joining said two hoses between said valve and said cylinder, whereby hydraulic pressure can slowly equilibrate automatically in said two hoses and accordingly in the two opposite chambers of said cylinder to prevent jamming of the wheels and to allow the same to return to their straight position automatically under the action of the resilient biasing means when the source of pressurized fluid is disengaged or in the case of a failure of said hydraulic system.

2. The steering assembly of claim 1 wherein said directional valve comprises a drawer and said control system comprises:

(g) a pivotal device fixed to the front end of said hitching bar, said pivotal device comprising:
a pivot plate pivotally mounted on said front end so as to be rotatable with limited slack about a vertical axis substantially perpendicular to the longitudinal axis of said frame; and
a steering fork connected to said pivot plate, said fork being operatively connectable to said towing vehicle so as to rotate said pivot plate about said vertical axis to the same extent as said towing vehicle when the same turns;

(h) a control rod having one end pivotally attached to one side of said pivot plate at a given distance from said vertical axis and another end connected to and holding said directional valve so as to move said directional valve forwards or rearwards when the rod is pulled or pushed as a result of the rotation of the pivot plate; and (i) control means for controlling and operating said directional valve as a function of the relative positions of said directional valve connected to the control rod and of said steerable wheels.

3. The steering assembly of claim 2, wherein said control means (i) comprises a push-pull cable having one end linked to the drawer of said valve and another end linked to one of the mounting means of said steerable wheels.

4. The steering assembly of claim 3, wherein said towed vehicle has only one set of steerable wheels at the rear of the frame.

5. The steering assembly of claim 3, wherein said towed vehicle has two sets of steerable wheels whose associated cylinders (a) are simultaneously operated by the same directional valve and control system (d).

6. The steering assembly of claim 5, wherein said towed vehicle also has at least one additional set of non-steerable wheels between said two sets of steerable wheels.

7. The steering assembly of claim 3, wherein:

(j) the front end of the hitching is provided with a jaw element for use to connect said hitching bar to a drawbar projecting from the towing vehicle, said jaw element having:
an upper horizontal ear and a lower horizontal ear between which said drawbar can be inserted;
a hole provided in each of said ears, said holes being aligned; and
a vertical connection bolt sized to fit into said holes, said connection bolt being insertable into a hole provided in said drawbar to pivotally connect the same to the jaw element;

(k) the pivot plate of the pivotal device is pivotally mounted on the upper ear of said jaw element and thus on the front end of said hitching bar by a bushing coaxial with said connection bolt; and (l) the steering fork of the pivotal device extends from said pivot plate towards said drawbar so as to engage the same and is tiltably mounted onto said pivot plate about a hinge that is transversal to the vertical axis of rotation of said pivot plate so as to allow said drawbar to tilt up and down relative to said hitching bar without unduly rotating the pivot plate.

8. The steering assembly of claim 7, wherein the steering fork of the pivotal device comprises:

a rigid strip having one end pivotally secured to said pivot plate by said hinge and another end carrying a short rod; and a pair of fingers secured to the short rod and projecting downwards in transversely-spaced relation so as to extend on both sides of the drawbar of the towing vehicle when said drawbar is secured by said pivot bolt to said hitching bar.

9. The steering assembly of claim 8, wherein said resilient biasing means (e) comprise a pair of pre-compressed coil springs, each spring being mounted over one of the corresponding piston rods and having one end rigidly fixed relative to said cylinder and another end operatively mounted over the piston rod so as to be compressable therewith.

10. The steering assembly of claim 9, wherein the mounting means of each set of steerable wheels comprise:

a transaxle extending transversally across the frame;

a knuckle having an inner side pivotally connected to each end of said transaxle about a vertical wheel pivotal axis and an outer side; and a stub axle secured to the outer side of each of said knuckles, said wheels being rotatably mounted on said stub axles;

said piston rods being pivotally connected to said knuckles at a distance from said wheel pivotal axis.

11. The steering assembly of claim 10 wherein said cylinder (a) is mounted onto the transaxle of the wheel mounting means by longitudinal displacement means comprising:

upper and lower stub members fixed to said cylinder;
bushings provided at outer ends of said stubs; and
upper and lower longitudinal guide channels fixed to said crossbar and in which the bushings at the outer ends of the stubs may freely slide.

12. The steering assembly of claim 10, wherein said towed vehicle has only one set of steerable wheels at the rear of the frame.

13. The steering assembly of claim 12, wherein said towed vehicle also has at least one other set of non-steerable wheels.

14. The steering assembly of claim 10, wherein said towed vehicle has two sets of steerable wheels whose associated cylinders (a) are simultaneously operated by the same directional valve and control system (d.

15. The steering assembly of claims 14, wherein said towed vehicle also has at least one additional set of non-steerable wheels between said two sets of steerable wheels.

16. The steering assembly of claim 10, wherein the push-pull cable having one end linked to the drawer of the directional valve is mounted in an envelope having a front end connected to the frame by a shock absorbing means comprising:

a rail fixed to the frame adjacent the frontmost bar;
a short bar slidably mounted on said rail;
a pair of pegs pivotally mounted on the short bar;
a link joining the opposite ends of said pegs; and
a pair of tension springs extending at opposite angles between each of said pegs and said rail respectively, the front end of said envelope being fixed to said link.

17. The steering assembly of claim 16 wherein said cylinder (a) is mounted onto the transaxle of the wheel mounting means by longitudinal displacement means comprising:

upper and lower stub members fixed to said cylinder;
bushings provided at outer ends of said stubs; and
upper and lower longitudinal guide members fixed to said transaxle and in which the bushings at the outer ends of the stubs may freely slide.

18. The steering assembly of claim 17, wherein said towed vehicle has only one set of steerable wheels at the rear of the frame.

19. The steering assembly of claim 17, wherein said towed vehicle has two sets of steerable wheels whose associated cylinders (a) are simultaneously operated by the same directional valve and control system (d).

20. The steering assembly of claim 19, wherein said towed vehicle also has at least one additional set of non-steerable wheels between said two sets of steerable wheels.

* * * * *

UNITED STATES PATENT AND TRADEMARK OFFICE
CERTIFICATE OF CORRECTION

PATENT NO. : 5,364,116
DATED : November 15, 1994
INVENTOR(S) : Michel HOULE et al It is certified that error appears in the above-identified patent and that said Letters Patent is hereby corrected as shown below:

In the Drawing:

In Figure 1: reference numeral "16" adjacent reference numerals "29" and "44" in the middle of the Figure should read --16'--;

reference numeral "33" in between reference numerals "38" and "40" on the bottom left side of the Figure should read --33'--;

In Figure 2: reference numeral "25" between reference numerals "47" and "27" on the top right side of the Figure should read --25'--.

Signed and Sealed this

Twenty-fifth Day of April, 1995

Attest:

BRUCE LEHMAN

Attesting Officer

Commissioner of Patents and Trademarks